(12) United States Patent
Chiang et al.

(10) Patent No.: US 7,200,625 B2
(45) Date of Patent: Apr. 3, 2007

(54) SYSTEM AND METHOD TO ENHANCE AVAILABILITY OF A RELATIONAL DATABASE

(75) Inventors: Ta-Jen Chiang, Kaohsiung (TW); Chun-Ching Lin, Hsin-Chu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 526 days.

(21) Appl. No.: 10/274,469

(22) Filed: Oct. 18, 2002

(65) Prior Publication Data

US 2004/0078398 A1    Apr. 22, 2004

(51) Int. Cl.
*G06F 12/00* (2006.01)
*G06F 17/30* (2006.01)

(52) U.S. Cl. ............ 707/204; 707/200; 707/201; 707/202; 707/203; 707/204

(58) Field of Classification Search ........ 707/200–204, 707/1, 100
See application file for complete search history.

(56) References Cited

U.S. PATENT DOCUMENTS

| | | | | |
|---|---|---|---|---|
| 6,035,412 A * | 3/2000 | Tamer et al. | ............ | 714/6 |
| 6,411,964 B1 * | 6/2002 | Iyer et al. | ............ | 707/200 |
| 6,578,041 B1 * | 6/2003 | Lomet | ............ | 707/102 |
| 6,658,589 B1 * | 12/2003 | Taylor | ............ | 714/6 |
| 6,732,123 B1 * | 5/2004 | Moore et al. | ............ | 707/202 |
| 6,820,098 B1 * | 11/2004 | Ganesh et al. | ............ | 707/202 |
| 6,957,221 B1 * | 10/2005 | Hart et al. | ............ | 707/100 |
| 2002/0103816 A1 * | 8/2002 | Ganesh et al. | ............ | 707/204 |
| 2003/0005120 A1 * | 1/2003 | Mutalik et al. | ............ | 709/225 |
| 2003/0093443 A1 * | 5/2003 | Huxoll | ............ | 707/204 |
| 2003/0115145 A1 * | 6/2003 | Lee et al. | ............ | 705/54 |
| 2003/0135478 A1 * | 7/2003 | Marshall et al. | ............ | 707/1 |
| 2003/0172158 A1 * | 9/2003 | Pillai et al. | ............ | 709/225 |
| 2004/0003003 A1 * | 1/2004 | McCartney et al. | ............ | 707/200 |

\* cited by examiner

*Primary Examiner*—Jeffrey Gaffin
*Assistant Examiner*—Cindy Nguyen
(74) *Attorney, Agent, or Firm*—Thomas, Kayden, Horstemeyer & Risley

(57) ABSTRACT

An enhanced method of reorganizing a relational database is provided. The method uses batch processing to perform the steps of providing an online database having a plurality of authoritative data stored there within; running the online database in an archive log mode for storing archival data capable of restoring all online database activity since running the online database in the archival mode; creating an off-line database by copying the plurality of authoritative data stored within the online database to the off-line database; performing a maintenance operation on the off-line database; taking the online database offline upon completion of the performance of the maintenance operation; copying the plurality of archival data from the online database to the off-line database when the online database is taken offline; recovering the off-line database by applying the copied plurality of archival data copied from the online database; and converting the off-line database to an online database.

19 Claims, 3 Drawing Sheets

SYSTEM AND METHOD TO ENHANCE AVAILABILITY OF A RELATIONAL DATABASE

FIELD OF THE INVENTION

The present invention is directed to a system and method for enhancing availability of a relational database.

BACKGROUND

Database availability and manageability have become increasingly important in many of today's mission-critical environments. It is inevitable that a certain amount of time is necessary for maintenance of a relational database, but it is important to keep this at a minimum. The ability of a database to reorganize data and restore a more efficient data block layout on a disk is important to improve overall database performance and disk space utilization.

A relational database is a database having a plurality of tables, wherein each table has authoritative data disposed there within, and at least one index, wherein the at least one index points to authoritative data within the table so that users of the relational database can access and change the authoritative data disposed within the table by using the at least one index. The index prevents more than one user from changing a single block of authoritative data simultaneously with another user of the relational database. As each single block of authoritative data is modified, the index grabs the data and then stores the single block into a memory location within a storage device.

In existing databases, creating or rebuilding an index to reduce fragmentation causes a basic table to be locked and no Data Management Language (DML) operation is allowed until an index operation is complete. Such a process is time consuming for databases having large tables.

Typically, a conventional maintenance operation performed on an online database, requires that the online database be taken off-line for approximately 12 to 24 hours while the maintenance operation, preferably a defragmentation operation is performed.

As described in U.S. Pat. No. 5,842,222 ('222 patent), and references cited therein which are herein incorporated by reference, as users update, add or delete records from a database, database table and index data blocks on a storage device such as a disk can become fragmented or non-contiguous resulting in an inefficient physical data block layout. The fragmented disk resulting query performance degradation is caused by added disk head movements and increased I/O response time. Additionally inefficient data block layout wastes disk space.

The '222 patent provides a production information system enhanced for availability wherein the '222 further provides a method for providing high availability in a production information system. The information system consists of a primary and a secondary copy running on a dual machine architecture. A backup database is added to the system which is updated from a daily transaction log. Database maintenance and archive procedures are performed periodically at a scheduled time using the backup database. However, the '222 patent does not provide a continuous method for maintaining the backup database according to actual usage, but instead provides for a daily backup of the primary and secondary databases.

A method to enhance availability and manageability of disk space on a database allows users full access to a database during a data reorganization operation. Using a conventional online method for defragmentation requires partitioning a database into a plurality of tables and then performing maintenance on each table one at a time. Such a defragmentation process severely limits access to not only an individual table, but also impacts overall database performance by allowing only limited activity to occur when a user accesses the online database during a defragmentation operation. Typically, the conventional online defragmentation operation can take approximately ten hours.

For example, Oracle8, a database management program developed by the Oracle Corporation located in Redwood Shores, Calif. has partitioned tables and indexes which allow administrators to perform maintenance on the partitioned tables and indexes one partition at a time offline while maintaining other partitions online. Oracle8 minimizes the impact of maintenance activities on data availability. Oracle8i, also developed by the Oracle Corporation improves upon Oracle8 by adding a new feature that allows administrators to perform required maintenance on a partitioned table and index while keeping the partitioned tables and indexes completely online and thus, available or accessible to end-users. Oracle8i improves data availability, query performance, response time and disk space utilization, all of which are important in a mission-critical environment.

However data reorganization considerations are associated with use of an Oracle system. Concurrent activity on a table during an online operation can be problematic. During an online operation, the Oracle systems Oracle8 and Oracle8i recommend that users minimize activities on the base table. Additionally, database activities should impact less than ten percent of the table while an online indexing/partitioning operation is in progress.

Also, Oracle does not recommend running online operations at peak times or running a batch job that modifies large amounts of data during an online data reorganization. When using Oracle during an online operation, a direct load, and import or export cannot be performed.

Oracle also provides a performance penalty for DML operations occurring during an online operation. Oracle estimates a performance overhead for DML operations during an online operation is comparable to a performance penalty of maintaining one extra index.

Currently, Oracle 9i, also developed by the Oracle Corporation, provides the capability for online table and index re-organization of a single table but not simultaneously on an entire regional database.

Existing systems provide a client in communication with an online database, wherein when the online database imported and exported data to an export dump file, the client was prevented from accessing the online database for extended periods of time, preferably ranging from 12 to 24 hours. For example, the architecture of such an off-line method is shown in FIG. 1, wherein the architecture of an existing off-line system comprises: a client device, an online relational database, and a dump file. The method as shown in FIG. 1 limits access to the relational database and is only single or partition table specific.

The present invention overcomes the problems with existing database management methods by providing a batch method for enhancing availability of a relational database, thereby reducing downtime of the relational database.

SUMMARY OF THE INVENTION

The data reorganization system and method of the present invention provides for re-organization of an entire online database. The present method is a batch re-organizational method for enhancing the availability of a relational database, the batch method provides for minimal downtime for the online database. The present invention performs a maintenance on a current database by using a replica of a primary online database.

The present invention exports data from a regional database to another storage space by recording new data and dumping the new data back into a re-organized table. If the data table is too big, database performance may be affected. The batch method of the present invention provides a method for data reorganization that reduces the downtime occurring when using a conventional offline method. The present invention uses actual usage requirements to determine whether to use an online or an off line method having the least impact on database access. The present invention provides a batch method that can be applied to all relational database data re-organization methods.

The method of enhancing a relational database system in accordance with one embodiment of the present has the steps of:
  a) providing an online database having a plurality of authoritative data stored there within;
  b) running the online database in an archive log mode for storing archival data capable of restoring all online database activity since running the online database in the archival mode;
  c) creating an off-line database by copying the plurality of authoritative data stored within the online database to the off-line database;
  d) performing a maintenance operation on the off-line database;
  e) taking the online database offline upon completion of the performance of the maintenance operation on the off-line database;
  f) copying the plurality of archival data from the online database to the off-line database when the online database is taken offline;
  g) recovering the off-line database by applying the copied plurality of archival data copied from the online database to the off-line database; and
  h) converting the off-line database to an online database.

Preferably, the method of the present invention uses the archive log mode to generate a plurality of redo logs and at least one archive log within the online database, wherein the plurality of redo logs and the at least one archive log comprise the archival data. The plurality of redo logs and the at least one archive log is generated by associating each instantaneous change made to the online database with one of the plurality of redo logs; and by associating each one of the plurality of redo logs with the at least one archive log to track all changes made to the online database while the online database runs in the archival mode.

Also, the step of creating the offline database preferably has the steps of:
  identifying an export mode, the export mode identifying a structure of the offline database, wherein the export mode is selected from the group consisting of a table, a user, and a full database;
  creating a dump file, the dump file having a plurality of database support creation statements embedded therein, and a copy of the plurality of authoritative data disposed therein wherein the plurality of authoritative data is associated with the database structure identified by the export mode;
  creating an off-line database structure using the plurality of database support creation statements embedded within the dump file; and
  creating a replica of the online database by importing the plurality of authoritative data associated with the database structure identified by the export mode into the off-line database structure.

In a preferred embodiment of the present invention, the export mode used to export the dump file from the online database to the offline database is the full database mode. In another preferred embodiment of the present invention, the offline database becomes a replacement database for the online database when the recovery of the offline database is complete, thereby allowing the relational database system to function with minimal interruption. Thus, the method of the present invention minimizes the time necessary to take the online database off-line to perform a data maintenance operation on the relational database. The maintenance operation performed in accordance with the present invention is preferably a defragmentation process, wherein the authoritative data stored within the online database is reorganized in an efficient manner in the off line database with minimal interruption of online use of the online database. The period of time taken to copy the archival data from the online database to the offline database is substantially less than the period of time taken to perform the maintenance operation. Typically, such an operation takes about 12 to 24 hours to both defragment a database and to update the database with incremental changes occurring during the defragmentation process. However, the present invention preferably takes less than 30 minutes to update the off line database to make the offline database compatible with the online database.

Optionally, the method of the present invention may be continuously repeated for each desired new maintenance operation.

An alternative embodiment in accordance with a method of performing the present invention is provided to enhance a relational database. The alternative embodiment provides a method having the steps of:
  providing a client device;
  providing an online database having a plurality of authoritative data stored there within, wherein the online database is in operative communication with the client device;
  creating an off-line database at a time T1 by copying the plurality of authoritative data stored within the online database from the online database to the offline database; running the online database in an archive log mode wherein each instantaneous change made to the online database is stored in an associated one of a plurality of redo log files and wherein each associated redo log file is stored in an archive log file to track all changes made to the online database since time T1;
  performing a maintenance operation on the offline database, wherein the maintenance operation is a defragmentation operation that operates to defragment authoritative data blocks thereby reorganizing authoritative disposed within a disk;
  copying the online archive log file and the redo log file created since time T1 to the offline database upon completion of the maintenance operation;
  preventing communication between the client device and the online database until the online database archive log file and redo log file are copied to the offline database;
  performing a recovery operation on the offline database, wherein the recovery operation of the online archive log file and the redo log file is complete at time T2; and converting the offline database to an online by providing communications between the client device and the offline database at time T2.

Preferably, in accordance with another preferred embodiment, the online database is temporarily taken offline at time T1 until the off-line database is created.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention provides an enhanced relational database method for reorganizing a relational database system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
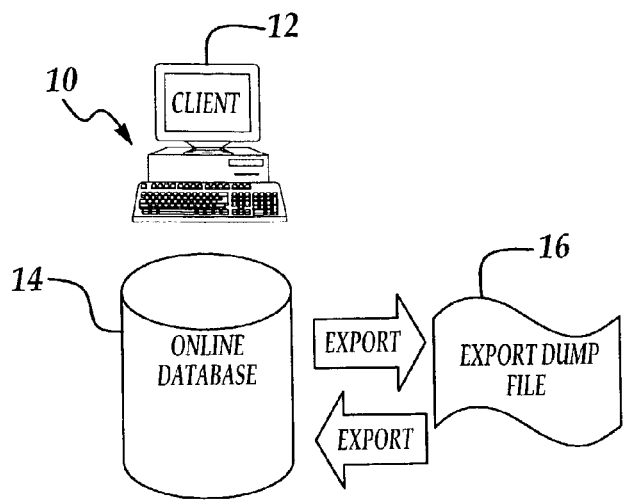
FIG. 1 is an architectural view of a conventional off-line database maintenance operation.
Figure 2:
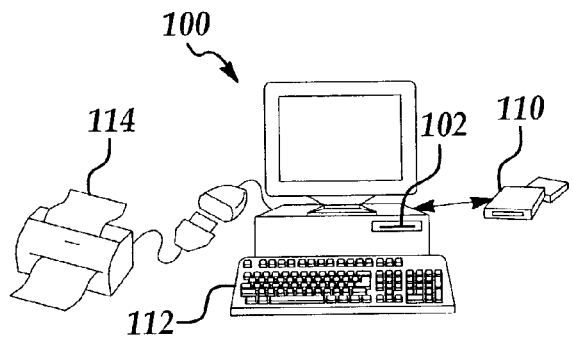
FIG. 2 is an illustration of digital computer system used to perform a database maintenance in accordance with a preferred method of the present invention.

Referring to FIG. 2, it is a block diagram of a computer system 100 upon which an embodiment of the present invention can be implemented.

Referring now to the drawings, in a preferred embodiment as shown in FIG. 2, the present invention is implemented with the aid of a digital computer system to perform database maintenance in accordance with the method of the present invention. One example of such a system is represented in FIG. 2. The illustrated digital computer system 100 includes a central processing unit (CPU) 102 having data, address and control buses and connections (not shown) to which at least a dynamic storage device 104 (referred to as main memory) coupled to a bus 106 for storing information and instructions to be executed by the CPU 102, at least one static storage device 108 having a corresponding data storage device 110 for storing static information and instructions for CPU 102, at least one data entry device 112, and at least one output device 114 are connected for control by the CPU 102.

The at least one data entry device 112 is provided for inputting authoritative data into a database. Additionally, the at least one data entry device 112 may include a keyboard (as shown in FIG. 2), a magnetic tape, and a floppy disk or other conventional input means well known in the data processing arts. Preferably the output device 114 is also attached thereto for communicating results of the present invention from the computer to another location.

The present invention is related to the use of computer system 100 to perform an enhanced relational database management method. According to a preferred embodiment, the management method is performed by computer system 100 in response to the CPU 102 executing sequences of instructions contained in main memory 104.

It should be noted that any combination of computer hardware (processor, monitor, memory, server, network, etc.) could be used to create the structure of the present system, as shown. It should also be noted that any of the software functions, steps or elements described herein could be implemented in any conventionally known computer.

The data reorganization system and method of the present invention provides for re-organization of an entire online database. The present method is a batch method, having less downtime impact on the online database than conventional single table methods.

The present invention exports data from a regional database to another storage space by recording new data and dumping the new data back into a re-organized database. The batch method of the present invention provides a method for data reorganization that reduces the downtime that occurs when using a conventional offline method. The present invention uses actual usage requirements to manage a regional database having the least impact on database access. The present invention provides a batch method that can be applied to all relational database data re-organization methods.

Figure 3:
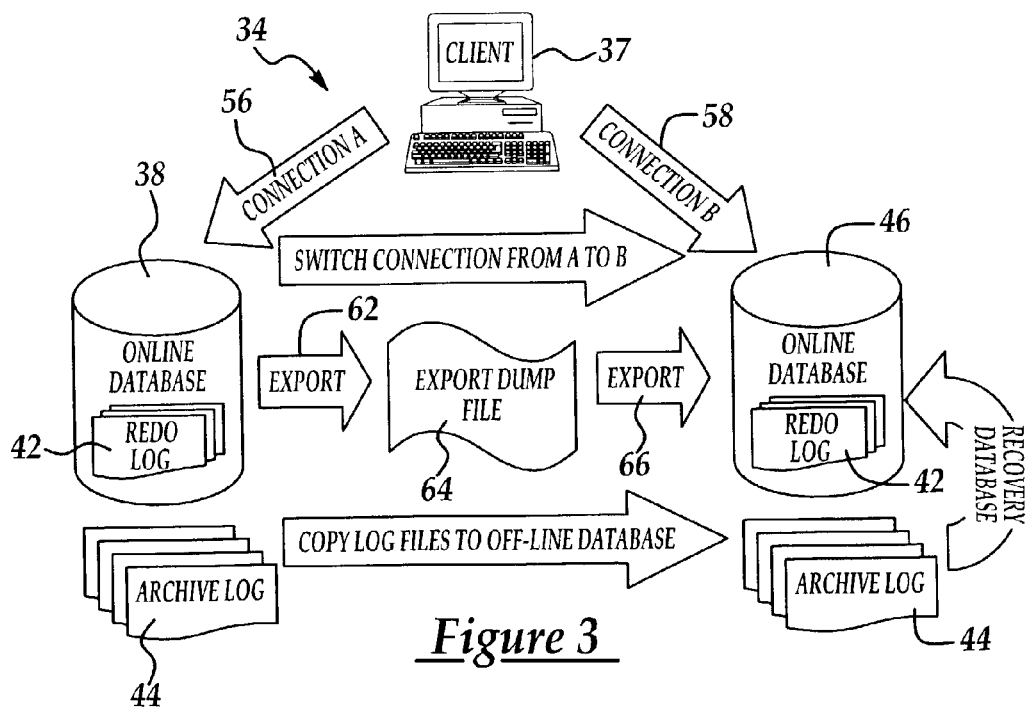
FIG. 3 is an overview block diagram of the steps performed using an enhanced availability of a relational database method in accordance with a preferred embodiment of the present invention.

FIG. 3 is an overview block diagram of the steps performed using the enhanced availability of a relational database method in accordance with a preferred embodiment of the present invention. The embodiment as shown in FIG. 3 provides a computer system 34 (wherein the computer system 34 is identical to the computer system 100 as shown in FIG. 2) having a client device 37, an online database 38 having a plurality of authoritative data 60, an export dump file 64, and an off-line database 46, wherein the client device 36 is in operative communication with the online database 38 via connection A 56, and wherein the client device 36 is in operative communication with the offline database 46 via connection B 58.

The client device 36 can toggle between connection A 56 to access the online database 38 and connection B 58 to convert the off-line database to an online database. Connection A 56 and B 58 are preferably provided using a network of buses connected to the online database 38 and to the off-line database 46. A plurality of authoritative data 60 (not shown) is exported from the online database 38 using an export function 62 to the export dump file 64.

The export function 62 identifies an export mode to define a database structure of the offline database and to export the plurality of authoritative data 60 from the online database 38 to the off-line database 46. The export mode may be selected from the group of: a table mode, a user mode, and a full database mode. The table mode exports a single table from the online database 38 to the off-line database 46, the user mode exports a selection of user-defined table ranging in size from a single table to a full database having a plurality of tables from the online database 38 to the off-line database 46, and the full database mode exports a full database from the online database 38 to the off-line database 46. The exporting mode may be started by using a set export start command and may be stopped by using a set export end command. The export dump file 64 has a plurality of data support file creation statements 70 (not shown) disposed there within and the export dump file 64 further has the plurality of authoritative data 60 disposed there within exported from the online database 38 to the export dump file 64. The plurality of data support file creation statements 70 define a structure of the off-line database 46 into which the plurality of authoritative data 60 or objects disposed within the online database 38 may be placed. The export dump file 64 is then imported into the structure of the offline database created using the plurality of data support file creation statements 70 thereby creating the offline database using an import function 66, the import function 66 defines an import mode, wherein the import mode may be started by using a set import start command and may be stopped by using a set import end command.

Figure 4:
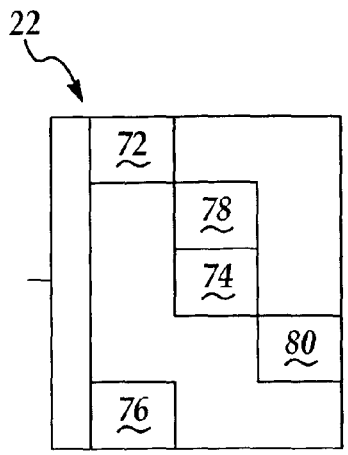
FIG. 4 illustrating a fragmented table having fragmented non-contiguous data blocks disposed there within.

The plurality of authoritative data 60 and an associated index disposed within the online database 38 can become fragmented over time during operation of the online database 38, wherein the plurality of authoritative data and the associated index form a data block. As shown in FIG. 4, illustrating a fragmented table 22, wherein a plurality of data blocks are stored in a memory device having a plurality of memory locations within the computer system 34, wherein the plurality of data blocks 72, 74, 76, 78, 80 become fragmented in a noncontiguous manner within the memory device, thus slowing down access to the plurality of data blocks 72, 74, 76, 78, 80 by a user of the relational database system. When the plurality of authoritative data 60 is exported to the export dump file 64, as described above, and is imported into the off-line database 46, the plurality of data blocks 72, 74, 76, 78, 80 are also replicated within a memory device storing the off-line database 46.

In a preferred embodiment, as shown in FIG. 3, the online database 38 preferably runs in an archive log mode, the archive log mode creates archival data capable of restoring all online database activity since running the online database in the archival mode.

Preferably, the method of the present invention uses the archive log mode to create a plurality of redo logs 42 and at least one or a plurality of archive logs 44 within the online database 38, wherein the plurality of redo logs 42 and the at least one archive log 44 form the archival data 60. The plurality of redo logs 42 and the at least one archive log 44 are created by associating each instantaneous change made to the online database 38 with one of the plurality of redo logs 42; and by associating each one of the plurality of redo logs 42 with the at least one archive log 44 to track all changes made to the online database 38 while the online database runs in the archival mode.

Figure 5:
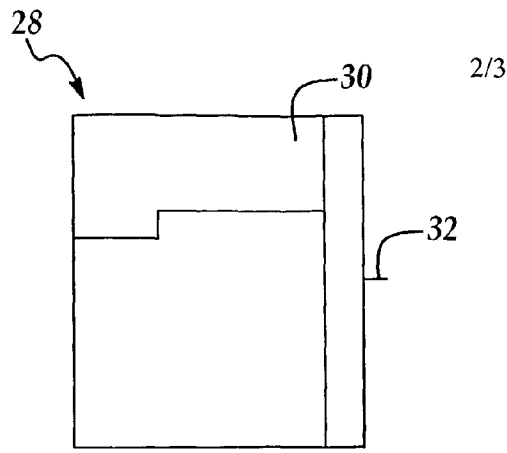
FIG. 5 illustrates a defragmented table having a contiguous data-block in accordance with a preferred embodiment of the present invention.

Preferably, while the online database 38 is running in the archival mode, a database maintenance operation is performed on the newly created offline database 46 to better organize the plurality of data block fragments in a contiguous and thus more efficient manner within the off-line database 46. Preferably, the database maintenance operation is a defragmentation operation wherein the defragmentation operation operates to re-organize the database fragments of the authoritative data into a contiguous data-block. FIG. 5. illustrates the plurality of data blocks 72, 74, 76, 78, 80 as shown in FIG. 4 defragmented into a single contiguous data block 30 disposed within a defragmented table 28. Additional space 32 is provided to allow additional data blocks to be defragmented within the defragmented table 28.

However, while the defragmentation operation performed in accordance with the present invention may take approximately 12 to 24 hours to complete, the defragmentation operation using the method of the present invention is transparent to a user of the online database 38 because the lengthy defragmentation process is performed off-line, wherein the online database 38 operates unimpaired during the entire defragmentation operation.

When the defragmentation operation performed in accordance with the present invention is complete, the plurality of archival data 60 including the plurality of redo logs and the at least one or the plurality of archive logs are copied from the online database 38 to the off-line database 46. Before the archival data is copied, the connection A between the client device and the online database 38 is discontinued for approximately 30 minutes and online access to the online database 38 is thereby prevented.

Once the plurality of archival data 60 is copied from the online database 38 to the off-line database 46, a recovery operation is performed on the off-line database. The recovery of the off-line database operates to apply the copied plurality of archival data from the online database 38 to the off-line database 46. Thus, the offline database becomes a replacement database for the online database when the recovery of the offline database is complete, thereby allowing the relational database system to function with minimal interruption.

Preferably, the off-line database is converted to an online database by toggling the connection between the client device from connection A to connection B.

The period of time taken to copy the plurality of archival data from the online database 38 to the off-line database 46 is substantially less than the period of time taken to perform the maintenance operation using a conventional online or a conventional off-line defragmentation method. The time that the online database 38 is taken offline to perform a recovery operation, wherein the recovery operation applies the plurality of redo logs and the at least one archive log to the off-line system, preferably takes 30 minutes or less.

Thus, the method of the present invention minimizes the time necessary to take the online database offline to perform a data maintenance operation on the relational database.

In another preferred embodiment of the present invention, the offline database 46 becomes a replacement database for the online database 38 when the recovery of the offline database is complete, thereby allowing the relational database system 34 to function with minimal interruption.

Figure 6:
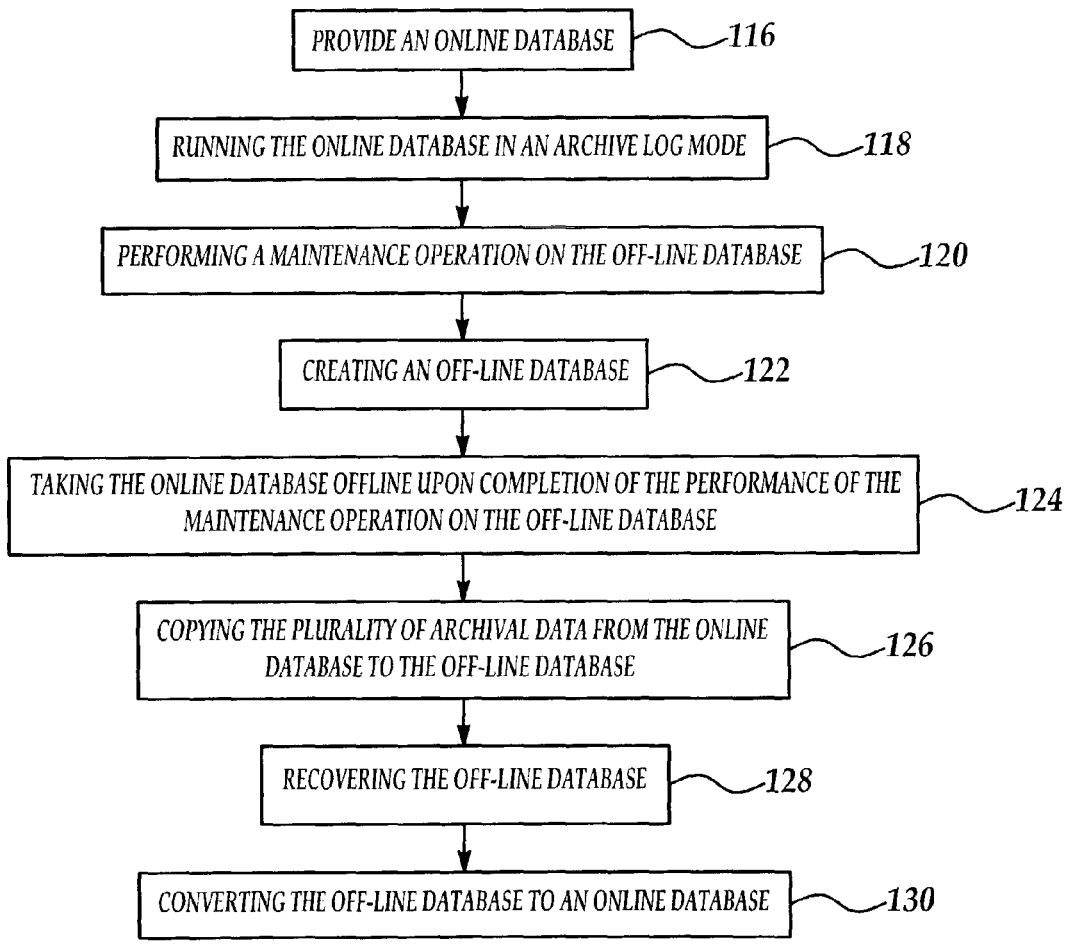
FIG. 6 illustrates a flow chart depicting an alternative embodiment of an enhanced relational database method in accordance with a method of the present invention.

Referring now to the flowchart illustrating steps of an alternative embodiment, as shown in FIG. 6, the enhanced relational database method has the steps of:

a) providing an online database having a plurality of authoritative data stored there within (step 116);

b) running the online database in an archive log mode for storing archival data capable of restoring all online database activity since running the online database in the archival mode (step 118);

c) creating an off-line database by copying the plurality of authoritative data stored within the online database to the off-line database (step 120);

d) performing a maintenance operation on the off-line database (step 122);

e) taking the online database offline upon completion of the performance of the maintenance operation on the off-line database (step 124);

f) copying the plurality of archival data from the online database to the off-line database when the online database is taken offline (step 126);

g) recovering the off-line database by applying the copied plurality of archival data copied from the online database to the off-line database (step 128); and h) converting the off-line database to an online database (step 130).

Preferably, the method further has the step of using the archive log mode to create a plurality of redo logs and at least one archive log within the online database (step 132, not shown), wherein the plurality of redo logs and the at least one archive log form the archival data. The plurality of redo logs and the at least one archive log are created by associating each instantaneous change made to the online database with one of the plurality of redo logs (step 134, not shown); and by associating each one of the plurality of redo logs with the at least one archive log (step 136, not shown) to track all changes made to the online database while the online database runs in the archival mode.

Figure 7:
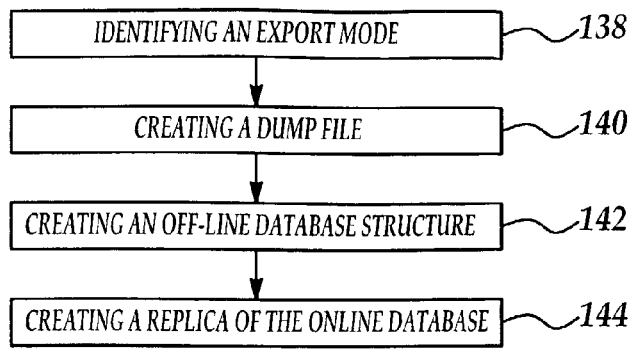
FIG. 7 illustrates a flow chart depicting steps necessary to create an off-line database in accordance with a preferred embodiment of the present invention.

As shown in more detail in FIG. 7, preferably, the step of creating the offline database (step 120, shown in FIG. 6) preferably has the steps of:

identifying an export mode, the export mode identifying a structure of the offline database, wherein the export mode is selected from the group consisting of a table, a user, and a full database (step 138);

creating a dump file, the dump file having a plurality of database support creation statements embedded therein, and a copy of the plurality of authoritative data disposed therein wherein the plurality of authoritative data is associated with the database structure identified by the export mode (step 140); creating an off-line database structure using the plurality of database support creation statements embedded within the dump file (step 142); and creating a replica of the online database by importing the plurality of authoritative data associated with the database structure identified by the export mode into the off-line database structure (step 144).

In a preferred embodiment of the present invention, the export mode used to export the dump file from the online database to the off-line database is the full database mode. However an individual table or a user predefined database having between at least one table up to a full database having a plurality of individual tables may be exported to the off-line database in accordance with the export mode selected. Exporting of a copy of the authoritative data stored within the online database is controlled by using a set export start command to define the export mode and begin the exporting process and a set export end command to step the exporting process are selected copied from the online database to the offline database.

In another preferred embodiment of the present invention, the offline database becomes a replacement database for the online database when the recovery of the offline database is complete, thereby allowing the relational database system to function with minimal interruption. Thus, the method of the present invention minimizes the time necessary to take the online database offline to perform a data maintenance operation on the relational database.

The maintenance operation performed in accordance with the present invention (step 122) is preferably a defragmentation process, wherein the authoritative data stored within the online database is reorganized in an efficient manner in the offline database with minimal interruption to a user of the online database. The period of time taken to copy the archival data from the online database to the off-line database is substantially less than the period of time taken to perform the maintenance operation. Typically, such an operation severely impacts the operation of an online database by taking about 12 to 24 hours to both defragment the database and to update the database with incremental changes occurring during the defragmentation process. However, while the defragmentation maintenance operation performed in accordance with the present invention may take 12 to 24 to be completed, the maintenance process is nearly transparent to a user of the online database because the lengthy maintenance process is performed offline. Additionally the time that the online database is taken offline during the recovery step (step 128) to apply the plurality of redo logs and the at least one archive log to the off-line system, preferably takes 30 minutes or less.

Optionally, the method of the present invention may be continuously repeated for each desired new maintenance operation (step 146, not shown).

Figure 8:
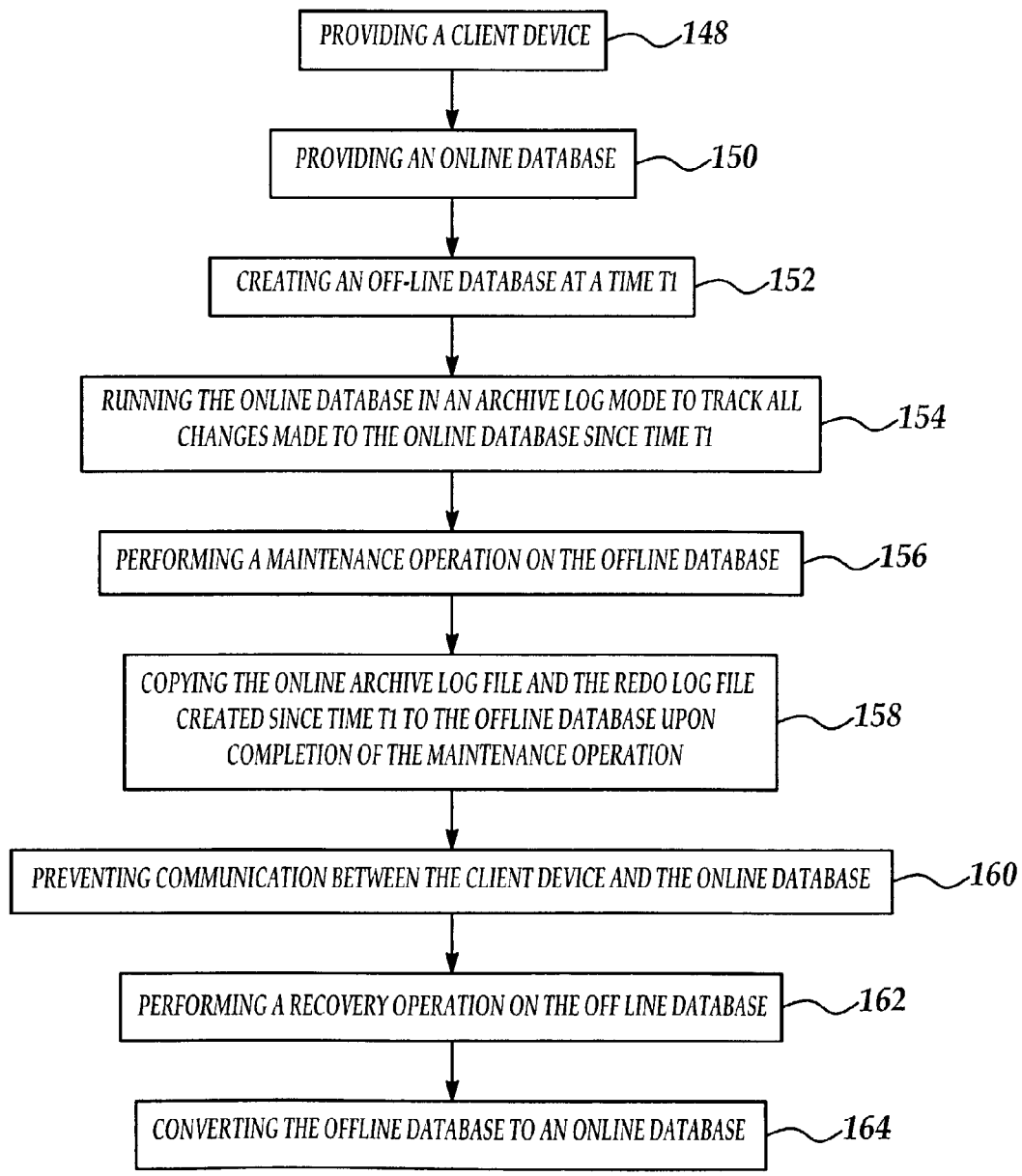
FIG. 8 illustrates a flow chart depicting an alternative embodiment of an enhanced relational database method in accordance with a method of the present invention.

An alternative embodiment in accordance with a method of performing the present invention is provided to enhance a relational database, as shown in FIG. 8. The alternative embodiment provides a method having the steps of:

providing a client device (step 148);

providing an online database having a plurality of authoritative data stored there within, wherein the online database is in operative communication with the client device (step 150);

creating an off-line database at a time T1 by copying the plurality of authoritative data stored within the online database from the online database to the offline database (step 152);

running the online database in an archive log mode wherein each instantaneous change made to the online database is stored in an associated one of a plurality of redo log files and wherein each associated redo log file is stored in an archive log file to track all changes made to the online database since time T1 (step 154);

performing a maintenance operation on the offline database, wherein the maintenance operation is a defragmentation operation that operates to defragment authoritative data blocks thereby reorganizing authoritative disposed within a disk (step 156); copying the online archive log file and the redo log file created since time T1 to the offline database upon completion of the maintenance operation (step 158);

preventing communication between the client device and the online database until the online database archive log file and redo log file are copied to the offline database (step 160);

performing a recovery operation on the offline database, wherein the recovery operation of the online archive log file and the redo log file is complete at time T2 (step 162); and converting the offline database to an online by providing communications between the client device and the offline database at time T2 (step 164).

Preferably, in accordance with another preferred embodiment, the online database is temporarily taken offline at time T1 until the off-line database is created (step 166, not shown).

From the foregoing, it should be appreciated that a method for enhancing a relational database is provided for improving overall operations of a relational database. While a plurality of preferred exemplary embodiments have been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A method of enhancing an online updateable relational database system to reduce user interruption associated with said database maintenance comprising the steps of:
    a) providing an online database having a plurality of authoritative data stored there within;
    b) running the online database in an archive log mode for storing a plurality of archival data capable of restoring to an off-line database all online database activity since running the online database in the archive log mode;
    c) creating said off-line database by copying the plurality of authoritative data stored within the online database to the off-line database;
    d) performing a maintenance operation on the off-line database;
    e) taking the online database offline upon completion of the performance of the maintenance operation on the off-line database;
    f) copying the plurality of archival data from the online database to the off-line database when the online database is taken off-line;
    g) recovering the offline database by applying the copied plurality of archival data copied from the online database to the off-line database; and
    h) converting the off-line database to an online database.

2. The method of claim 1 further comprising the step of:
    using the archive log mode to create a plurality of redo logs and at least one archive log within the online database, wherein the plurality of redo logs and the at least one archive log comprise the plurality of archival data.

3. The method of claim 2 wherein the step of using the archive log mode to create the plurality of redo logs and the at least one archive log within the online database comprises the steps of:
    associating each instantaneous change made to the online database with one of the plurality of redo logs; and
    associating each one of the plurality of redo logs with the at least one archive log to track all changes made to the online database while the online database runs in the archive log mode.

4. The method of claim 1 wherein the step of creating the off-line database comprises the steps of:
    identifying an export mode, the export mode identifying a structure of the off-line database, wherein the export mode is selected from the group consisting of a table, user defined, and a full database;
    creating a dump file, the dump file having a plurality of database support creation statements embedded therein, and a copy of the plurality of authoritative data disposed therein wherein the plurality of authoritative data is associated with a database structure identified by the export mode;
    creating an off-line database structure using the plurality of database support creation statements embedded within the dump file; and
    creating a replica of the online database by importing the plurality of authoritative data associated with the database structure identified by the export mode into the off-line database structure.

5. The method of claim 4 wherein the export mode selected is full database.

6. The method of claim 1 wherein the off-line database becomes a replacement database for the online database when the recovery of the off-line database is complete.

7. The method of claim 1 wherein the step of performing the maintenance operation comprises the step of performing a defragmentation process.

8. The method of claim 1 wherein the period of time taken to copy the archival data from the online database to the off-line database is substantially less than the period of time taken to perform the maintenance operation.

9. The method of claim 1 further comprising the step of:
    repeating steps a) through h) of claim 1 when a new database maintenance operation is desired.

10. A method of enhancing an online updateable relational database system to reduce user interruption associated with said database maintenance comprising the steps of:
    providing an online database having a plurality of authoritative data stored there within;
    running the online database in an archive log mode for storing archival data capable of restoring all online database activity since running the online database in the archive log mode;
    using the archive log mode to create a plurality of redo logs and at least one archive log within the online database;
    creating an off-line database by copying the authoritative data stored within the online database to the off-line database;
    performing a maintenance operation on the off-line database;
    taking the online database off-line upon completion of the performance of the maintenance operation on the off-line database;
    copying the plurality of redo logs and the at least one archive log to the off-line database when the online database is taken off-line;
    recovering the off-line database by applying the copied plurality of redo logs and the at least one archive log to the off-line database; and
    converting the off-line database to an online database.

11. The method of claim 10 wherein the step of using the archive log mode to create the plurality of redo logs and the at least one archive log within the online database comprises the steps of:
    associating each instantaneous change made to the online database with one of the plurality of redo logs; and
    associating each one of the plurality of redo logs with the at least one archive log to track all changes made to the online database while the online database runs in the archive log mode.

12. The method of claim 10 wherein the step of creating the off-line database comprises the steps of:
    identifying an export mode, the export mode identifying a structure of the off-line database, wherein the export mode is selected from the group consisting of a table, user defined, and a full database;
    creating a dump file, the dump file having a plurality of database support creation statements embedded therein, and a copy of the plurality of authoritative data disposed therein wherein the plurality of authoritative data is associated with the database structure identified by the export mode;

creating an offline database structure using the plurality of database support creation statements embedded within the dump file; and creating a replica of the online database by importing the plurality of authoritative data associated with the database structure identified by the export mode into the offline database structure.

13. The method of claim 12 wherein the export mode selected is full database.

14. The method of claim 10 wherein the off-line database forms a replacement online database for the online database when the recovery of the off-line database is complete.

15. The method of claim 10 wherein the step of performing the maintenance operation comprises the step of performing a defragmentation process.

16. The method of claim 10 wherein the period of time taken to copy the archival data from the online database to the off-line database is substantially less than the period of time taken to perform the maintenance operation.

17. The method of claim 10 further comprising the step of:
repeating steps a) through h) of claim 10 when a new database maintenance operation is desired.

18. A method of enhancing an online updateable relational database to reduce user interruption associated with said database maintenance comprising the steps of:

providing a client device;

providing an online database having a plurality of authoritative data stored there within, wherein the online database is in operative communication with the client device;

creating an off-line database at a time T1 by copying the plurality of authoritative data stored within the online database from the online database to the off-line database;

running the online database in an archive log mode wherein each instantaneous change made to the online database is stored in an associated one of a plurality of redo log files and wherein each associated redo log file is stored in an archive log file to track all changes made to the online database since time T1;

performing a maintenance operation on the off-line database, wherein the maintenance operation is a defragmentation operation that operates to defragment authoritative data blocks thereby reorganizing the plurality of authoritative data;

copying the online archive log file and the redo log file created since time T1 to the off-line database upon completion of the maintenance operation;

preventing communication between the client device and the online database until the online database archive log file and redo log file are copied to the off-line database;

performing a recovery operation on the off-line database, wherein the recovery operation of the online archive log file and the redo log file is complete at time T2; and converting the off-line database to an online database by providing communications between the client device and the off-line database at time T2.

19. The method of claim 18, wherein the online database is temporarily taken offline at time T1 until the off-line database is created.

* * * * *